United States Patent
Depot et al.

(10) Patent No.: US 8,056,699 B2
(45) Date of Patent: Nov. 15, 2011

(54) PAN INVERTING AND/OR CLEANING SYSTEM

(75) Inventors: Nicol Depot, Weedon (CA); Luc Gendron, Fabreville (CA)

(73) Assignee: Rexfab Inc., Sherbrooke (CA)

( * ) Notice: Subject to any disclaimer, the term of this patent is extended or adjusted under 35 U.S.C. 154(b) by 133 days.

(21) Appl. No.: 12/641,355

(22) Filed: Dec. 18, 2009

(65) Prior Publication Data
US 2010/0094454 A1    Apr. 15, 2010

Related U.S. Application Data

(63) Continuation of application No. PCT/CA2008/001202, filed on Jun. 20, 2008.

(60) Provisional application No. 60/945,476, filed on Jun. 21, 2007.

(51) Int. Cl.
*B65G 47/22* (2006.01)

(52) U.S. Cl. ........ 198/402; 198/412; 134/153; 414/418; 414/758

(58) Field of Classification Search .......... 198/402–405, 198/412; 414/418–419, 758, 772–773; 134/153
See application file for complete search history.

(56) References Cited

U.S. PATENT DOCUMENTS

| | | | |
|---|---|---|---|
| 2,104,422 A * | 1/1938 | Heichert | 414/567 |
| 3,603,269 A | 9/1971 | Royer | |
| 3,700,129 A | 10/1972 | Maude | |
| 4,774,737 A | 10/1988 | Hanson | |
| 6,139,243 A * | 10/2000 | Jackson et al. | 414/405 |
| 6,142,287 A * | 11/2000 | Biffert et al. | 198/404 |
| 6,209,705 B1 | 4/2001 | Drewitz | |
| 6,230,360 B1 | 5/2001 | Singleton et al. | |
| 6,250,871 B1 | 6/2001 | LeCrone et al. | |
| 6,755,149 B2 | 6/2004 | Herman | |
| 7,175,017 B2 | 2/2007 | Carey et al. | |
| 2006/0165513 A1* | 7/2006 | Tiepelmann et al. | 414/759 |

FOREIGN PATENT DOCUMENTS

| | | | | |
|---|---|---|---|---|
| JP | 57019218 A | * | 2/1982 | 198/403 |
| WO | 9613450 | | 9/1996 | |

OTHER PUBLICATIONS

International Search Report of PCT/CA2008/001202.

* cited by examiner

*Primary Examiner* — Mark A Deuble
(74) *Attorney, Agent, or Firm* — Norton Rose OR LLP

(57) ABSTRACT

A pan inverting system (10) comprises a rotating table (11) having a central longitudinal axis (13), the table being rotatably mounted within a static frame (15) for rotation about the longitudinal axis (13). Conveyors (21) are disposed on opposed pan-receiving surfaces (20) of the table (11). The conveyors (21) are independently operable to displace a pan (12) along the table (11) in a direction substantially parallel to the longitudinal axis (13). A pan engagement device (24) within the table (11) is operable to releasably fasten the pan (12) to the pan receiving surface (20) of the table (11), such that when the pan (12) is fastened to one of the pan receiving surfaces (20) by the pan engagement mechanism (24), rotation of the table (11) about the longitudinally extending axis (13) will invert the pan (12). The table (11) may also equipped with air headers (507), nozzles and/or air knives (508) to clean the pans (12), for example during the rotating operation, by injecting cleaning air jets onto the surfaces of the pan (12).

41 Claims, 4 Drawing Sheets

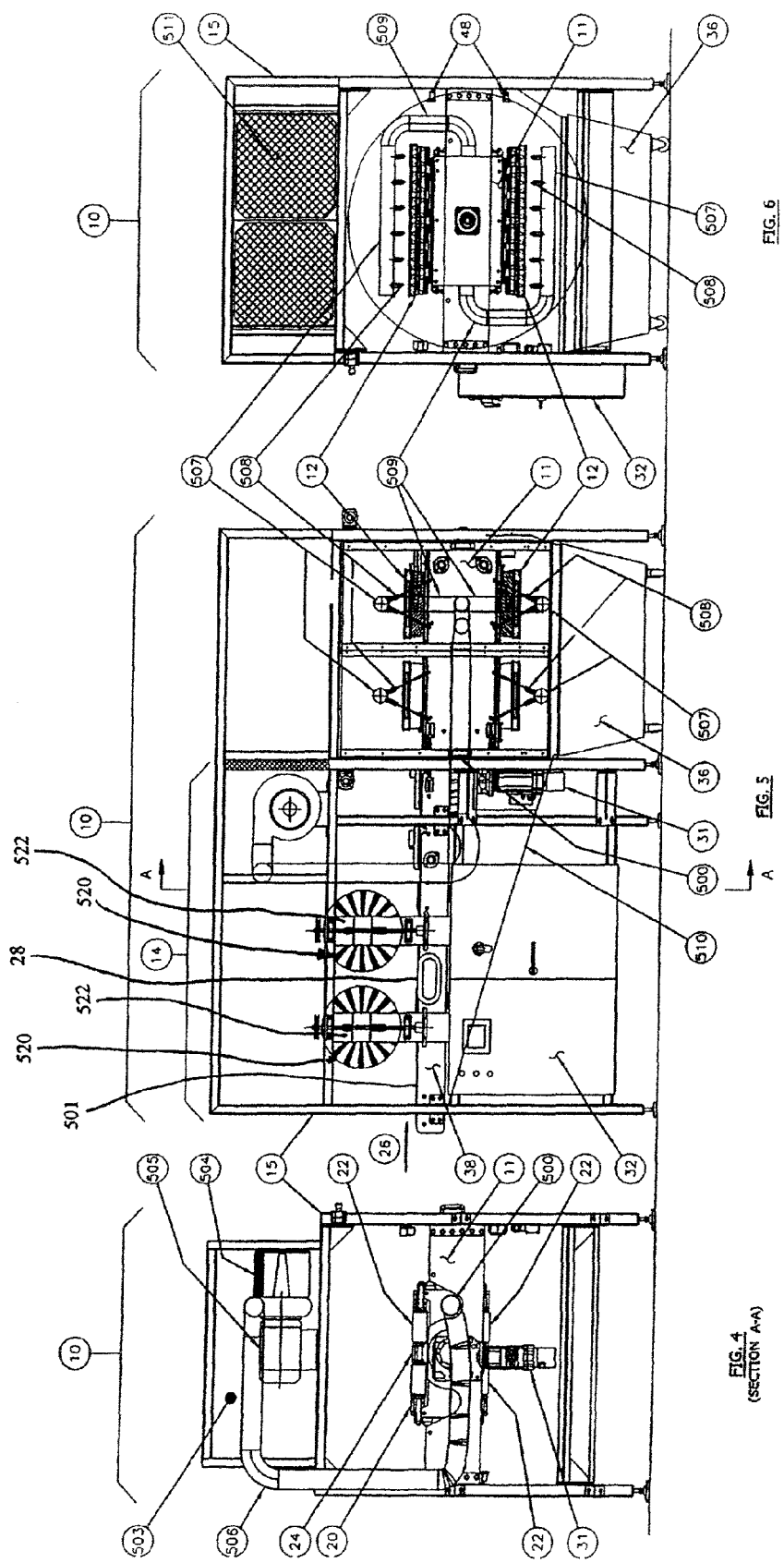

PAN INVERTING AND/OR CLEANING SYSTEM

CROSS-REFERENCE TO RELATED APPLICATIONS

The present application is a continuation of International Patent Application No. PCT/CA2008/001202 filed Jun. 20, 2008, which claims priority on U.S. Provisional Patent Application No. 60/945,476 filed Jun. 21, 2007, the entire contents of which are incorporated herein by reference.

TECHNICAL FIELD

The present invention relates generally to equipment and systems for the commercial production of food, beverage and/or pharmaceutical goods, and more particularly to pan inverting systems used in such commercial processes.

BACKGROUND OF THE ART

In commercial bakeries and other commercial production lines, automated systems and processes are used to produce products, such as breads, rolls, buns, cookies, chocolates, frozen foods, dairy products, beverages, pharmaceuticals and the like, in large volumes and typically in a generally continuous manner. The pans within which such products are contained during the production process are usually displaced by conveyors to facilitate the movement of a large number of these pans from one location within the establishment to another. For example, one example of a typical commercial bread baking process is as follows: a pan is first conveyed to a make-up station in which the raw dough is loaded into the individual pans; the pan then travels to a proofing area in which the dough is allowed to rise; once the dough has risen, the pan is transported by conveyor into a oven in which the dough is baked so as to turn into bread; once the baked bread exits the oven, it is removed from the individual baking pans and allowed to cool before being packaged for shipment; and the baking pans are either returned to the first make-up station to be loaded with new dough or stored in a pan storage area until a new production order using these pans is required.

Such continuous production lines thus require a large number of these pans to be moved around, usually via conveyors. One handling process which is desirable in the displacement of such pans is the ability to invert the pans, i.e. turn them either upside down or right-side up. This can be useful for a variety of reasons, including to facilitate emptying the products from the pan, or to facilitate the storage and/or cleaning of the pans.

For example, it is preferable that when not in use or while they are waiting to be filled, re-used, cleaned or stored, etc., the pans be stacked one on top of the other such as to minimize the space occupied thereby. However, if the pans are stacked on top of each other in a right-side up direction (i.e. with the interior surfaces which receive the bread dough therein facing upwards), then at least the upper most pan is exposed to the environment for a period of time, thus risking that dirt or other unwanted material falls into the recesses of the pan. Further, when stacked on top of each other a right-side up direction, the load of a stacked pile of pans is transmitted through the more delicate inner surfaces of the pans rather than the more robust and reinforced edge regions, which is not the case when stacked in an upside down orientation. It can also be desirable to be able to invert the pans for a number of other reasons, such as to empty out the contents of the pan or to permit cleaning of the interior surfaces of the pan with the aid of gravity, air jets, brushes, etc.

The cleaning process in particular is much more easily accomplished when the pans are upside down. However, to be able to do this, the pans must first be turned upside down, cleaned, and then turned back right-side up before they can be re-used in the process assembly line. This process of inverting the pans twice can be quite time consuming with currently employed pan inverting systems, and in a continuous and high-volume production setting, any pan inverting system employed must be able to accommodate a very high throughput which is now required in most modern commercial bakeries, such as a throughput of 30 or more pans per minute.

Thus, while there have been various previous attempts to provide pan inverting systems, there are disadvantages associated with these known systems. Typically, these systems include some type of rotating drum or wheel, having a number of radially extending flaps or clamps on which pans are loaded, one pan per paddle or clamp on the rotating drum/wheel. Once one or more pans are loaded, the wheel is rotated thereby turning the pans end-over-end to turn them upside down, before being unloaded from the wheel. One disadvantage with these types of systems is that the pan loading and wheel rotation steps are discrete activities, and thus subsequent movement of the pans ceases until these steps are executed. These pan inverting systems, with their discrete movements and "flip" turning end-over-end motion of the pans, cannot be operated fast enough to invert the high volume numbers of pans required in most commercial bakeries today. Also, some of these systems subject the pans to free fall movement that is only broken by the pan striking a hard surface. This shock loading can, over time, weaken the pans and significantly reduce their useful lifetimes. This "flip" turning method of inverting the pans end-over-end using a paddle-wheel style system also tends to generate significant noise, created by each pan being flipped over and striking the exit surface or conveyor. Such noise is undesirable in a commercial bakery operating continuously for long periods of time.

Accordingly, an improved pan inverting system is desired.

SUMMARY OF THE INVENTION

It is an object of the present invention to provide an improved pan inverting and/or cleaning system.

There is therefore provided, in accordance with one aspect of the present invention, a pan inverting system comprising: a rotating table having substantially parallel pan-receiving surfaces on opposite sides of the table, the pan-receiving surfaces having longitudinally spaced apart inlet and outlet ends between which a pan is displaceable, the table being rotatably mounted within a static frame for rotation about a longitudinally extending axis of rotation; a conveyor disposed on each of said pan-receiving surfaces of the table, each said conveyor being independently operable to displace pans along the corresponding pan-receiving surface in a direction substantially parallel to said longitudinally extending axis of rotation; and a pan engagement mechanism disposed within the table and operable to releasably fasten the pans to either of said pan receiving surfaces of the table when the pans are disposed thereon, such that when the pans are fastened to one of the pan receiving surfaces by the pan engagement mechanism, rotation of the table about the longitudinally extending axis will invert the pan.

There is also provided, in accordance with another aspect of the present invention, a pan inverting system comprising a table rotatably mounted within a static frame, the table having substantially parallel first and second pan-receiving surfaces disposed on opposed sides of the table, the first and second pan-receiving surfaces respectively having first and second conveyors thereon, the first and second conveyors being independently operable to displace pans therealong, the table being rotatable within the frame about a longitudinal axis of the table disposed at a transverse mid-point thereof, the table including a pan engagement mechanism operable to independently retain said pans on either of the first and second pan-receiving surfaces throughout a rotation of the table, and a motor operatively connected to the table for effecting rotation of the table in 180 degree increments about said longitudinal axis, thereby inverting the one of said pans. There is also provided, in accordance with another aspect of the present invention, a method of inverting pans in a commercial production line, the method comprising: feeding a pan onto an upper surface of a rotating table using a first conveyor disposed on the upper surface, the table having a lower surface opposite the upper surface; releasably fastening the pan in place on the upper surface of the rotating table using a pan engagement mechanism; rotating the table 180 degrees about a longitudinal axis of the table, such that the upper surface of the table and the pan fastened thereto are inverted, the longitudinal axis being centrally located in a transverse direction and extending substantially parallel to a direction of displacement of the pan along the first conveyor; and activating the first conveyor to displace the inverted pan away from the table until the pan has been ejected from the table.

There is further provided, in accordance with yet another aspect of the present invention, a method of cleaning pans using a pan inverting system, the method comprising: using at least one entry conveyor to displace a pan through brushes which scrub right-side-up surfaces of the pan; using a conveyor disposed on said upper surface of the table to positioning the pan in place on an upper surface of a rotating table beneath an air header; and directing cleaning air jets out of the air header onto the right-side-up surfaces of the pan on the upper surface of the table using at least one of nozzles and air knives in fluid flow communication with the air header.

BRIEF DESCRIPTION OF THE DRAWINGS

Further features and advantages of the present invention will become apparent from the following detailed description, taken in combination with the appended drawings, in which:

FIG. 4 is a cross-sectional view of a pan inverting system in accordance with another aspect of the present invention which incorporates a cleaning system therewith, the cross-section taken through line A-A of FIG. 5;

FIG. 5 is a side elevational view of the pan inverting and cleaning system of FIGS. 4; and FIG. 6 is an end view of the pan inverting and cleaning system of FIG. 5.

DETAILED DESCRIPTION OF THE PREFERRED EMBODIMENTS

Figure 1:
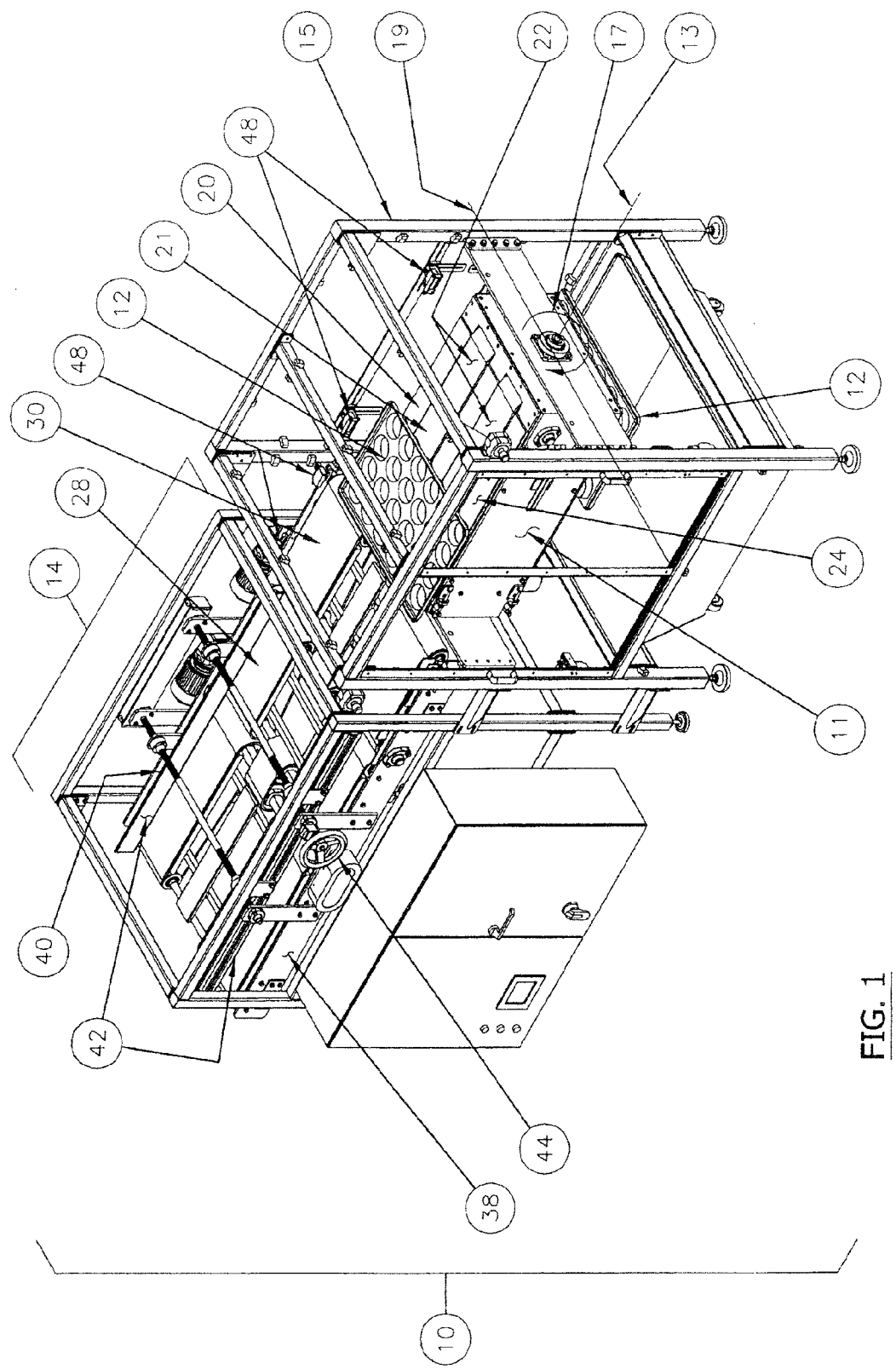
FIG. 1 is a top perspective view of a pan inverter in accordance with one aspect of the present invention.

As noted above, it is desirable to be able to rapidly and reliably invert pans used in a high throughput commercial production setting for a number of reasons, including, but not limited to, emptying goods from the pan, to facilitate cleaning of the pans and to facilitate storage of the pans. It is to be noted that the term "inverted" as used herein is intended to comprise both turning pans upside down which are initially right-side up, and/or vice versa. The process of inverting pans using the pan inverting system of the present invention is more efficient, rapid and reliable than with most prior art pan inverting devices, permitting continuous use at a high-volume throughput rate. Such high-volume throughput rate may be, for example, of the order of 30 or more pans/minute, and more preferably of more than 40 pans/minute. Therefore, the table of the system is able to rotate (i.e. in 180 degree increments) more than 30 times per minute, and more preferably more than 40 times per minute. Presuming one pan is located on the table each time it rotates, this means that more than 30 pans/minute can be inverted by the present system. However, it is to be understood that much higher throughput rates are of course also possible, if more than a single pan is located on the table each time it rotates. For example, a number of pans can be accumulated before they reach the rotating table of the present system, and several pans at a time can be fed onto the table for inversion thereof. Providing that the total combined surface area of these several pans remains smaller than the surface area of the rotating table (i.e. that the table is sufficiently large to accommodate several of the pans), this enables a two, three or more fold increase (depending on the number of pans which can fit onto the table surface) in the number of pans which can be inverted using the present system. Depending on the process, the inversion speed (rotational speed of the table) of the present system can of course be controlled as required, in order to decrease or increase the inversions per minute. Presuming one pan is located on the table 11 each time it rotates, the speed of the pan inverter 10 can vary, for example, between 1 pan/minute to more than 40 pans/minute.

It is also of note that although the present system is described herein with specific reference to its use in one particular embodiment, that is for inverting baking pans such as those used in commercial bakeries, it is to be understood that this is but one possible use of the present pan inverting and/or cleaning system, which can also be used in a number of other industrial or commercial production processes, such as for the production of food, beverage and/or pharmaceutical goods. Therefore, the present pan inverting system can be used to invert other types of pans which receive, support and/or otherwise contain food, beverage and/or pharmaceutical products during the production thereof. For example, the present system can be used to invert and/or clean pans used to produce products which include, but are not limited to, breads, cakes, cookies, chocolates, frozen foods, dairy products, beverages and pharmaceuticals, to name but a few.

Figure 2:
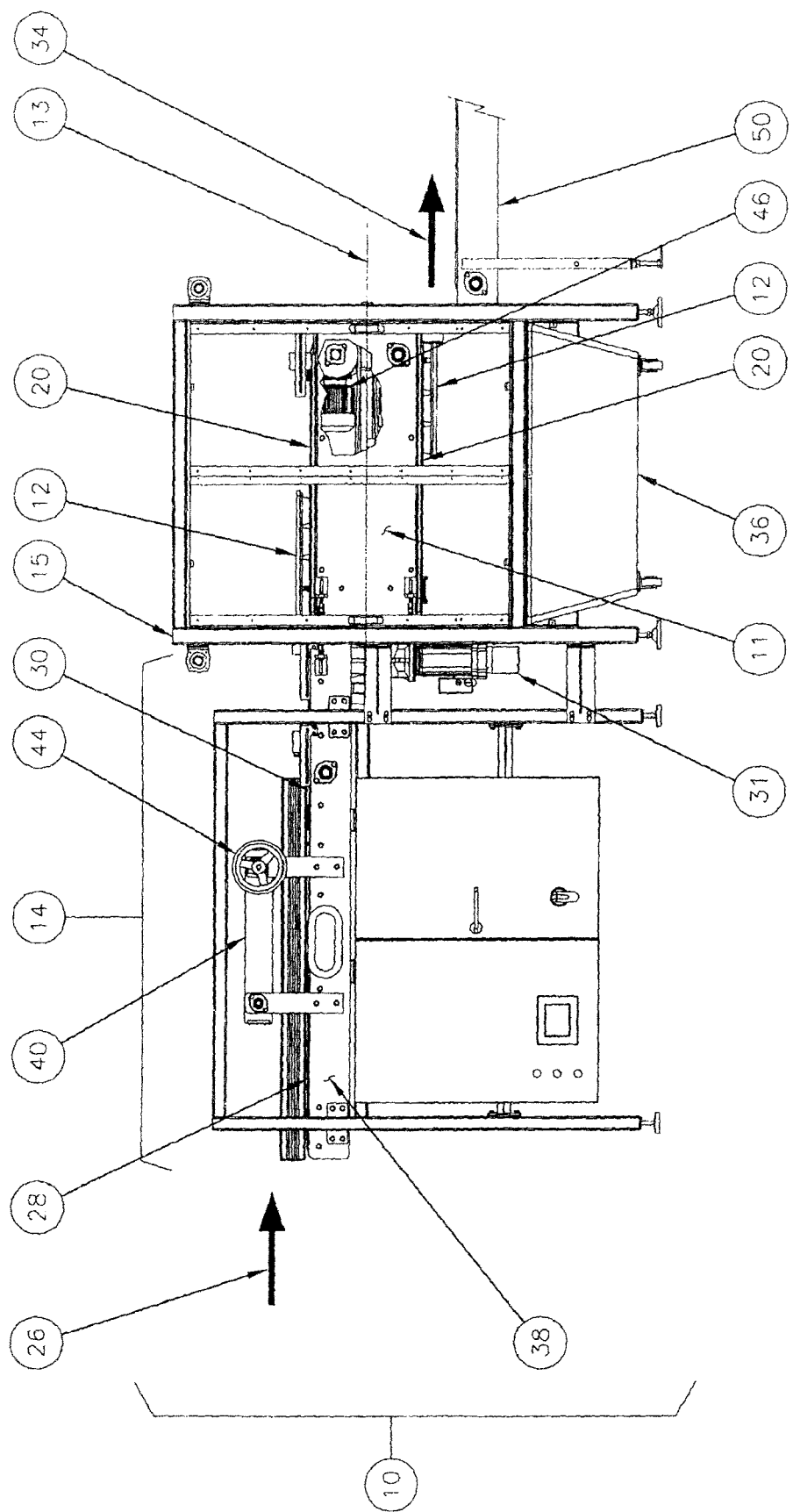
FIG. 2 is a side elevation view of the pan inverter of FIG. 1.
Figure 3:
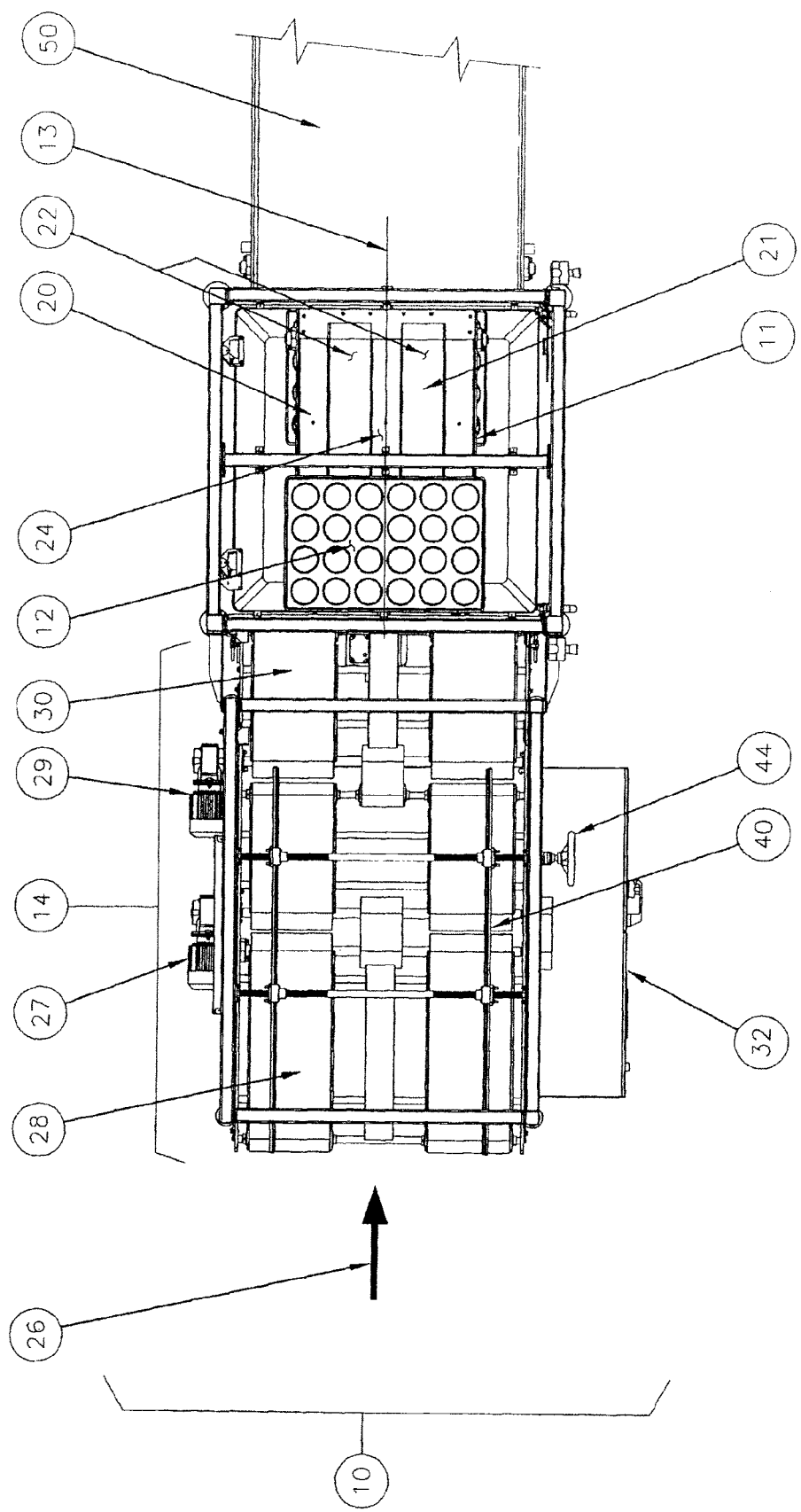
FIG. 3 is a top plan view of the pan inverter of FIG. 1.

Referring to FIGS. 1-3, the pan inverter device 10 is depicted in relative isolation, i.e. without the associated upstream and downstream conveyors which would be present when the pan inverter 10 is used in-line within a continuous production line. The pan inverter 10 operates to invert pans 12 (see FIGS. 2-3) which are fed onto the inverter 10. This is done, as will be described in further detail below, by rotating an entire table portion 11 of the device about a longitudinal axis thereof. This differs from most prior art pan inverting systems, wherein the pans are typically turned upside down by being flipped end-over-end about an axis which extends transversally relative to the direction of travel of the pans on the conveyor, whether this is done about the long or short axis of the rectangular pans. In the present pan inverter 10, however, the pans 12 are inverted by rotating them around a longitudinal axis of the pan which is substantially parallel to the direction of travel of the pans on the conveyor feeding the pan inverting device 10.

Therefore, the pan inverter 10 will invert pans fed therein, causing pans which are right-side up (i.e. with their bread dough and/or product receiving recesses facing upwards) when they enter the pan inverter 10 to come out upside down, and vice versa. The pan inverter 10 also permits pans to be inverted regardless of the orientation in which they are fed into the device. For example, pans fed into the inverting device 10 in a longitudinally extending direction (i.e. the so-called "easy-way") will exit the device in this same orientation, and similarly, pans entering the device in a transversally extending direction (i.e. the so-called "hard-way") will exit the device in this orientation. Due to the pan engagement device which releasably retains the pans in place on the rotating table 11 of the present system 10, as described in further detail below, lateral guides are not required on the rotating table 11 in order to align the pans.

The pan inverter 10 includes a rotating table portion 11 which is rotatably mounted within a static frame structure 15, such as to permit the entire table portion 11 to rotate, such as in direction 17 for example, about an axis of rotation 13 in 180 degree increments. Rotation in the opposite direction is of course also possible. The axis of rotation 13 extends parallel to a central longitudinal axis 13 of the rectangular table, and is therefore described hereinafter as the longitudinal axis of the table. This longitudinal axis of rotation is disposed at a lateral mid-point of the table. The axis of rotation 13 is in fact preferably located at both a lateral and vertical mid-point of the table 11 such that the table 11 rotates about its longitudinal center. The longitudinal axis 13 preferably extends through the center of the table, both relative to the transverse (width) and vertical (depth) dimensions thereof Thus, the table 11 is able to fully rotate about this central longitudinally extending axis of rotation 13. To simplify wiring and any air duct connections to the rotating table 11, such as the air duct connection 500 described below, the table 11 is first rotated 180 degrees in one rotation direction (ex: clockwise), and then next rotated back in the opposite rotational direction (ex: counter clockwise). Regardless, the table 11 will always rotate about the longitudinal rotation axis 13, or rotatably reciprocate about this axis in the case when it is driven in successive and alternating opposite rotational directions, such that the table 11 remains substantially in the same position (i.e. longitudinally, laterally and in a height direction) within the frame structure 15 at all stopped positions. As the table rotates about the centrally located longitudinal axis 13, the moment forces to which the table is exposed are limited, in comparison for example with a table or pan displacing car or trolley which pivots about a side hinge thereby resulting in significant displacement of the pivoting structure. Rotation of the table 11 is generated by a suitable motor 31 (not shown for clarity in FIG. 1, but see FIG. 2), such as an electrical servo, step or brake motor for example.

The table portion 11 of the pan inverter 10 is generally a cuboid (i.e. a rectangular box), defining a length relative to the longitudinal axis 13, a width relative to a transverse axis 19 that is substantially perpendicular to the longitudinal axis and in the same plane, and a height in a direction substantially perpendicular to the plane defined by the longitudinal and transverse axes. The cuboid-shaped table 11 thus includes three pairs of parallel and equally shaped faces, which include the major or primary faces 20 which accept and support the baking pans thereon. On each of these pan-receiving primary faces 20 of the rotating table 11 is provided an independently operable conveyor 21, which may include two conveyor belts 22. In the present embodiment, the two conveyor belts 22 are laterally spaced apart in a transverse direction such that a central, longitudinally extending gap exists therebetween.

The rotating table 11 is also provided with a pan engagement mechanism 24 which when actuated retains the pans fixed in place on the table as the table is rotated. This engagement mechanism acts therefore to temporarily attract the pans to the table. The pan engagement mechanism 24 may be, for example, located within the central longitudinally extending gap of the table, between the two belts 22 of the conveyor 21. In one embodiment, wherein the pans being used are made of a ferromagnetic metal for example, the pan engagement mechanism includes a magnetic engagement device. The pan-engagement mechanism 24 may therefore include permanent magnets and/or electromagnets which are sufficiently strong to attract metal pans fed onto the pan-receiving surfaces 20 of the table, and retain them in place thereon before, during and after the entire table portion 11 has been rotated 180 degrees about the longitudinal axis 13, thereby inverting both the table 11 and any baking pans 12 releasably fastened thereto using the magnetic pan-engagement mechanism 24. If permanent magnets are used, the motion of the conveyor 21, when actuated, must be sufficient to dislodge the pans from their fastened positions such as to displace them along the pan-receiving surface 20 of the table 11. However, the translational force (in the longitudinal direction) which is exerted on the pans by the conveyor 21 need only be greater than a friction force acting against the pan, in order to be able to move than pan away from the table 11. Given that the translational force of the conveyor and the inward inwardly directed (i.e. towards the center of the table 11) magnetic force exerted on the pans by the magnets are perpendicular to each other, the inward magnetic force of the pan-engagement mechanism 24 need only be calibrated to maintain the pan on the table surface. As long as the longitudinal force is greater than the opposite friction force, the pan will move away from the table 11. Alternately, electromagnets can be used in the magnetic pan-engagement mechanism 24, where the inward force acting on the pan 12 needs to be modulated due to the weight and material resistance of the pan 12. Although the electro-magnet would act in a similar manner to a "permanent" magnet, its inward force could be calibrated to hold up the suspended pan long enough for it to be fed off of the inverted surface 20 of the table 11 and onto an exit conveyor downstream of the inverter device 10.

In another embodiment, wherein the pans being used are made of a non-magnetic material such as aluminum, plastic, etc., the pan engagement mechanism 24 of the pan inverter 10 includes a suction-operated pan engagement device. The suction engagement device employs a vacuum generating air suction system, in lieu of the magnets or electromagnets described above, in order to retain the non-magnetic pans in place on the rotating table during the inversion process. Accordingly, a vacuum is produced on the pan-receiving surface 20 of the table 11 upon which the pans are to be received, the suction force of the vacuum being sufficiently strong to attract the aluminum or plastic pans and retain them in place thereon before, during and after the entire table portion 11 has been rotated 180 degrees about the longitudinal axis 13, thereby inverting both the table 11 and the non-magnetic pans 12 releasably fastened thereto using the suction pan-engagement mechanism. Once the pan has been inverted, elimination of the suction force will allow the pan to drop from the table face 20. The suction force produced by the vacuum of the suction system can be controlled and/or varied, as required depending on the size and weight of the pans being used.

As noted above, each of these primary pan-receiving surfaces 20 of the rotating table 11 are provided with an independently operable conveyor 21, and with a magnetic pan-engagement mechanism 24. Thus, both faces 20 of the rotating table 11 are substantially identical. Thus, when the table 11 is rotated 180 degrees about its longitudinal axis 13, the other of the two major faces 20 is then upwardly facing and ready to accept another pan which is fed thereon for inversion.

In operation, referring to FIGS. 2-3, a baking pan 12 is fed in a forward direction 26 in the conveying system of the production facility onto an upstream or entry conveyor assembly 14 of the present system. The entry conveyor 14 continues to move the pan 12 forward using conveyors, which in at least one embodiment includes at least two separate but aligned conveyors 28 and 30, each driven by a separate motor 27 and 29 respectively. A third conveyor, namely an accumulator conveyor, may also be used. Such an accumulator conveyor 501 is described below with regard to the embodiment of FIGS. 4-6. The conveyors 28,30 respectively act as metering and ejection conveyors, which together feed the pans into the inverter unit 10 at a suitable speed and frequency. Each of these conveyors can be independently controlled if necessary, such as to ensure an entry speed onto the table 11 which is fine tuned to a desired level. Also, as will be described, for the transition of the pans from the conveying system of the facility onto the rotating table 11 to be a smooth and continuous process, the conveyor 21 of the table portion 11 must be driven at the same speed as the ejection conveyor 30. The entry conveyor assembly 14 includes the metering and ejection conveyors 28, 30 mounted to a static frame structure 38 which is preferably substantially horizontal and aligned with the table 11 of the downstream pan inverter unit 10. The frame structure 38 of the entry conveyor assembly 14 includes, in at least one embodiment, a guide mechanism 40 which is fixed thereto and used to align and position, for example centrally on the metering and ejection conveyors 28, 30, the pans 12 as they are received into the present system. The guide mechanism 40 includes adjustable guide rails 42 (see FIGS. 1-3) which are either manually actuated using the hand-wheels 44 as shown or alternately automatically using automatic actuators, in order to restrict the width of the "channel" within which the pans in order to help ensure the pans 12 are fed onto the rotating table 11 of the inverter 10 in an aligned position.

The entire process of inverting pans 12 using the present pan inverting system is preferably fully automated. Thus, using a control system operated for example via a control panel 32 (see FIG. 3), pans 12 are fed onto the upper surface 20 of the table 11 by operating the conveyor 21 of the table 11 at the same speed as the ejection conveyor 30. Once the pan 12 is fully located on the table 11 (for example at the mid-point thereof), as detected by suitable sensors of the control system, the control system acts to immediately stop motion of the conveyor 21 of the upper surface 20 of the table 11 in order to stop the translating movement of the pan 12. The pan-engagement mechanism 24 is then used to releasably fasten the pan to the upper surface 20 of the table 11, whether simply by proximity or contact with the metallic pan in the case of a permanent/electromagnetic system or by modulated actuation by the control system in the case of an air suction system. The entire table 11 is then rotated by 180 degrees about the longitudinal axis 13 by the indexing motor 31, such that the entire table 11, and therefore the pan 12 still fastened to the now upside down surface 20 thereof, has been inverted. The pan 12 is then inverted, and suspended upside down to the now underside of the table, as shown in FIG. 2. In this position, cleaning of the upside down pan can be carried out. The conveyor 21 beneath the inverted pan is then actuated by the control system, in order to drive the belts 22 thereof which thus displace the inverted pan away from table 11 in an exit direction 34 (see FIG. 2), such as to eject the inverted baking pan, suspended upside down on the underneath of the table, onto an outlet conveyor 50 which displaces the inverted pans off to a location of the facility as required. If the pan inverter 10 is used only to clean pans 12, for example in cases where the pans 12 are either required immediately for another production cycle or are being stored "right-side up", the entire table 11 is then rotated again by 180 degrees about the longitudinal axis 13 by the indexing motor 31, such that the entire table 11, and therefore the pan 12 still fastened thereto, is repositioned "right-side up". The conveyor 21 underneath the pan is then actuated by the control system, in order to drive the belts 22 thereof which thus displace the "right-side up" pan away from table 11 in an exit direction 34 (see FIG. 2), such as to eject the pan 12, now in a "right-side up" position on the upper surface 20 of the table 11, onto an outlet conveyor 50 which displaces the inverted pans off to a location of the facility as required.

As noted above, the conveyors 21 on each of the opposed faces 20 of the rotating table 11 are independently operated and controlled, and each may be driven by separate motors 46 (see FIGS. 1-3), such that they are easily independently operated. Although various alternatives are possible, one sequence of events would be that once the table 11 has been rotated 180 degrees to invert a first pan, the conveyor 21 which is now upwardly facing is able to immediately accept another pan thereon. As such, once the table has been turned, the conveyor 21 which upwardly facing is turned on and run at a speed substantially the same as that of the inlet ejection conveyor 30, such as to accept the next pan 12 being fed along the conveying system. As the first, now inverted pan 12 is being ejected from the pan inverter 10 by the upside down conveyor of the table 11, the table 11 is able to simultaneously accept the next pan 12 onto the free, upwardly facing surface 20 of the table 11 using the other of the two conveyors 21 on the table. This is possible as the two conveyors 21 on the opposed faces 20 of the table 11 are independently operated and controlled, and thus can be run at different speeds. Thus, the inverter 10 operates much more efficiently and rapid than most prior art systems, permitting a large number of pans to be inverted in a continuous manner. Tests have shown that the pan inverter 10 is able to accommodate pan throughputs of at least 40 pans/minute if pans are fed one at a time onto the upwardly facing surface 20 of the table. The action of inverting and cleaning pans is conducted in a relatively small space volume in comparison with much larger systems of the prior art.

As shown in FIG. 2, a debris collector 36 may be provided directly beneath the rotating table 11 of the inverter 10, for catching and collecting any debris, such as crumbs, etc., which may fall out of the baking pans 12 when the are inverted by the table 11.

As best seen in FIG. 6, the pan inverter 10 may include a number of sensors, detectors, and the like which are used to control the system using the interconnected control system. For example, one or more position sensors 48 are preferably provided on the fixed frame 15 of the pan inverter 10, such as to be able to detect the presence and position on the table 11 of a baking pan 12. Thus, such sensors are used to determine when to turn on and off the conveyors 21 on either of the opposed faces 20 of the rotating table 11. It is to be understood that various other sensors may be included as part of the control system, such as to permit the full automation of the inverter 10 operating in a manner as described above. Those skilled in the art will appreciate the number and types of sensors and other control electronics which may be required in order to permit the full automation of the present system.

Referring now to the embodiment of FIGS. 4-6, the present pan inverter device 10 is integrated into a cleaning system for inverting and/or cleaning the pans 12. The system includes an air distribution assembly and is provided with a semi-air tight enclosure to continuously recycle and filter the same volume of air employed for the cleaning of the pans and/or the suction pan engagement mechanism. The enclosure is also preferably insulated to reduce the ambient noise level near the pan inverter 10.

As seen in FIG. 4, the air distribution assembly includes a high efficiency blower 505 disposed within a blower chamber 503 mounted atop the frame structure 15. The blower chamber 503 encloses a final air filter 504 which cleans the recycled air before it enters the blower 505. The air intake to the blower 505 creates a negative air pressure in the rotating table chamber, which is connected to the blower 505 via a two filter system 511. The air and suspended particles will be sucked back to the air blower 505 through the two filter system 511. Filter gages located on the outside of the pan inverter chamber will indicate the level of filtering efficiency and replacement periods. The air is then pushed through the ducting 506, which may include a combination of rigid and flexible corrugated ducts, to the table 11. The air duct connection 500 with the rotating table 11 occurs on one side of the table below the ejecting conveyor 30 of the conveyor assembly 14. The air duct connection 500 rotates above or below the longitudinal rotation axis 13 along with the first table 11 rotation of 180 degrees in one rotation direction (ex: clockwise). The air duct connection 500 will then rotate back 180 degrees in the opposite rotational direction (ex: counter clockwise) when the table is again rotated.

As seen in FIG. 5, the system is shown in an arrangement where multiple pans are cleaned simultaneously. First, pans 12 are fed in a forward direction in the conveying system of the production facility onto the upstream or entry conveyor assembly 14 of the present assembly. The entry conveyor 14 continues to move the pan 12 forward using conveyors, which in at least one embodiment include three separate but aligned conveyors, namely an accumulator conveyor 501, a metering conveyor 28 and an ejecting conveyor 30. Above the accumulator 501 and the metering 28 conveyors, two transversely extending rotating brushes 520, mounted on adjustable brackets 522, are used to carry out the first cleaning phase of the pan 12 whereby the "right-side up" surface of each pan is scrubbed to loosen debris on the pans 12. The adjustable brackets 522 allow for height adjustment of the brushes 520, and can permit the brushes 520 to be removed from the pan inverter 10 for cleaning, repair or replacement. A portion of the debris from the scrubbing operation carried out by the brushes 520 may fall underneath the accumulator conveyor 501 and metering conveyor 28 onto a metal slide 510 which will redirect such debris into the recuperation bin 36. Pans are aggregated on the metering conveyor 28 before being ejected through the ejecting conveyor 30 onto the table 11 upper surface. In the embodiment described in FIG. 5, the pans 12 are positioned below four air headers 507 disposed immediately above the rotating table 11, each air header 507 having "v" shape nozzles or air knives 508. Air headers 507 are fed from side ducts 509 on each lateral side of the table 11. The air duct connection 500 to the table 11 below the ejecting conveyor 30 is spliced, inside the table, to feed each air header 507. Although four such air headers 507 are depicted, each having "v" shaped air knives 508, those skilled in the art will appreciate that single or multiple connections of air headers to the table 11 or to the static frame structure 15 and various air knives/nozzle configurations, sizes and distances between air knives/nozzles and the table 11 surfaces are possible, and may vary depending on the type of pans 12 being cleaned. Pan inverter controls 32 are located below the accumulator 501 and metering 28 conveyors to facilitate access thereto and to provide a complete self-contained pan inverter 10 unit.

FIG. 6 best shows the second phase of the cleaning operation of the present pan inverting and cleaning system, where pans 12 are positioned on the table 11 surface and below the transversely extending air headers 507 on which are disposed the air ejecting nozzles or air knives 508 thereabove for the ejection of air onto the surfaces of the pans for cleaning purposes. As shown, both opposed surfaces of the table 11 preferably have at least one air header 507 thereabove, the headers rotating along with the table as it rotates between positions to accept the next pan thereon. The presence and/or location on the table surface is detected by suitable sensors of the control system. High air volume and high static pressure will then be provided by the air headers 507 and the nozzles or air knives 508 onto the "right-side up" surface of the pans 12. This operation will be continuous as the table 11 rotates into a now upside down position. Solid debris will then be free fall into the recuperation bin 36 located beneath the rotating table 11, and any fine particles in suspension will be carried to the blower filtering system due to the negative air pressure environment in this semi air tight pan inverter chamber.

Although the pan inverter is described above primarily with respect the application wherein the pans are received into the pan inverter in a right side up orientation, and are thus then turned upside down by the rotating table 11 of the pan inverter 10, it is to be understood that the present invention is equally applicable to an application wherein the pans 12 are upside down initially (i.e. they are received into the inverter 10 upside down), and are thus turned right side up by the pan inverter 10. Similarly, pans may be fed to the pan inverter 10 right side up and exit right side up since only the cleaning and not necessarily the storing functionality of the pan inverter 10 may be used.

The embodiments of the invention described above are intended to be exemplary. Those skilled in the art will therefore appreciate that the forgoing description is illustrative only, and that various alternatives and modifications can be devised without departing from the spirit of the present invention. For example, although the term pan or baking pan is used herein to refer to the object which is being inverted by the present system, it is to be understood that other types processing equipment for use in a variety of industries, including but not limited to the production of cake, cookies, chocolate, frozen food, dairy products, beverages or pharmaceuticals, can similarly be inverted by the present device, including trays, racks, and the like. Accordingly, the present is intended to embrace all such alternatives, modifications and variances which fall within the scope of the appended claims.

The invention claimed is:

1. A pan inverting system comprising:
   a rotating table having substantially parallel pan-receiving surfaces on opposite sides of the table, the pan-receiving surfaces having longitudinally spaced apart inlet and outlet ends between which a pan is displaceable, the table being rotatably mounted within a static frame for rotation about a longitudinally extending axis of rotation;
   a conveyor disposed on each of said pan-receiving surfaces of the table, each said conveyor being independently operable to displace pans along the corresponding pan-receiving surface in a direction substantially parallel to said longitudinally extending axis of rotation; and
   a pan engagement mechanism disposed within the table, the pan engagement mechanism including a pan engagement device on each of the pan receiving surfaces of the table, the pan engagement devices being independently operable to releasably fasten the pans to either of said pan receiving surfaces of the table when the pans are disposed thereon, such that when the pans are fastened to one of the pan receiving surfaces by the corresponding pan engagement device, rotation of the table about the longitudinally extending axis will invert the pan.

2. The pan inverting system as defined in claim 1, wherein the longitudinally extending axis of rotation is disposed at a transverse mid-point of the table.

3. The pan inverting system as defined in claim 2, wherein the longitudinally extending axis of rotation is disposed at a vertical mid-point of the table.

4. The pan inverting system as defined in claim 1, wherein the pan engagement mechanism includes a magnetic engagement device.

5. The pan inverting system as defined in claim 4, wherein the magnetic engagement system includes at least one of a permanent magnet and an electromagnet.

6. The pan inverting system as defined in claim 1, wherein the pan engagement mechanism includes a suction engagement device operable to retain the pan in position on the pan-receiving surface by generating a vacuum.

7. The pan inverting system as defined in claim 1, further comprising a pan cleaning system integrated therewith.

8. The pan inverting system as defined in claim 7, wherein the pan cleaning system comprises at least air jets for cleaning the pans.

9. The pan inverting system as defined in claim 8, further comprising at least one air header disposed above each of the pan-receiving surfaces and transversely extending thereacross.

10. The pan inverting system as defined in claim 9, wherein said air headers are mounted to one of the rotating table and the static frame, the headers rotating with the table when mounted thereto.

11. The pan inverting system as defined in claim 9, wherein a plurality of at least one of nozzles and air knives are disposed on the air headers for ejection of air from the air header onto the pans therebeneath, thereby cleaning the pans using forced air.

12. The pan inverting system as defined in claim 7, wherein the pan cleaning system includes at least one rotating brush located adjacent an entry conveyor assembly disposed upstream of the table, the rotating brush cleaning the pans conveyed along the entry conveyor prior of the pans being fed onto the table.

13. The pan inverting system as defined in claim 12, wherein said at least one brush is mounted to an adjustment mechanism permitting at least vertical adjustment of the brush towards and away from the pans conveyed therebeneath by the entry conveyor assembly.

14. The pan inverting system as defined in claim 1, further comprising a motor operatively connected to the table for effecting rotation of the table in 180 degree increments about said longitudinally extending axis of rotation.

15. The pan inverting system as defined in claim 14, further comprising a control system in communication with the motor and the conveyors disposed on the pan-receiving surfaces of the table, said control system being configured to fully automate the at least one of inversion and cleaning of the pans using the pan inverting system.

16. The pan inverting system as defined in claim 15, further comprising at least one entry conveyor assembly disposed upstream of the table, the entry conveyor assembly including an ejection conveyor immediately upstream of the table, the control system matching the speed of the conveyors disposed on each of the pan-receiving surfaces of the table, when actuated, with the speed of the ejection conveyor.

17. A pan inverting system comprising a table rotatably mounted within a static frame, the table having substantially parallel first and second pan-receiving surfaces disposed on opposed sides of the table, the first and second pan-receiving surfaces respectively having first and second conveyors thereon, the first and second conveyors being independently operable to displace pans therealong, the table being rotatable within the frame about a longitudinal axis of the table disposed at a transverse mid-point thereof, the table including a pan engagement mechanism operable to independently retain said pans on either of the first and second pan-receiving surfaces throughout a rotation of the table, and a motor operatively connected to the table for effecting rotation of the table in 180 degree increments about said longitudinal axis, thereby inverting said pans.

18. The pan inverting system as defined in claim 17, wherein the pan engagement mechanism includes a magnetic engagement device having at least one of a permanent magnet and an electromagnet.

19. The pan inverting system as defined in claim 17, wherein the pan engagement mechanism includes a suction engagement device operable to retain the pans in position on the pan-receiving surfaces by generating a vacuum.

20. The pan inverting system as defined in claim 17, further comprising a pan cleaning system integrated therewith.

21. The pan inverting system as defined in claim 20, wherein the pan cleaning system comprises at least air jets directed at the pans retained on the pan-receiving surfaces of the table, thereby cleaning the pans using forced air.

22. The pan inverting system as defined in claim 21, further comprising at least one air header disposed above each of the pan-receiving surfaces.

23. The pan inverting system as defined in claim 22, wherein said air headers are mounted to one of the rotating table and the static frame, the headers rotating with the table when mounted thereto.

24. The pan inverting system as defined in claim 22, wherein a plurality of at least one of nozzles and air knives are disposed in fluid flow communication with the air headers for ejection of air from the air header onto the pans therebeneath.

25. The pan inverting system as defined in claim 20, wherein the pan cleaning system includes at least one rotating brush located adjacent an entry conveyor assembly disposed upstream of the table, the rotating brush cleaning the pans conveyed along the entry conveyor assembly prior of the pans being fed onto one of the pan-receiving surfaces of the table.

26. The pan inverting system as defined in claim 25, wherein said at least one brush is mounted to an adjustment mechanism permitting at least vertical adjustment of the brush towards and away from the pans conveyed therebeneath by the entry conveyor assembly.

27. The pan inverting system as defined in claim 17, wherein the pan engagement mechanism includes a pan engagement device on each of the pan receiving surfaces of the table, the pan engagement devices being independently operable.

28. The pan inverting system as defined in claim 17, further comprising a control system in communication with the motor and the conveyors disposed on the pan-receiving surfaces of the table, said control system being configured to fully automate the inversion of the pans using the pan inverting system.

29. The pan inverting system as defined in claim 28, further comprising an entry conveyor assembly disposed upstream of the table, the entry conveyor assembly including an ejection conveyor immediately upstream of the table, the control system matching a speed of the conveyors disposed on each of the pan-receiving surfaces of the table, when actuated, with the speed of the ejection conveyor.

30. A method of inverting pans in a commercial production line, the method comprising:

feeding a pan onto an upper surface of a rotating table using a first conveyor disposed on the upper surface, the table having a lower surface opposite the upper surface;

releasably fastening the pan in place on the upper surface of the rotating table using a pan engagement mechanism, the pan engagement mechanism including a pan engagement device on each of the upper and lower surfaces of the table, each of the pan engagement devices being independently operable;

rotating the table 180 degrees about a longitudinal axis of the table, such that the upper surface of the table and the pan fastened thereto are inverted, the longitudinal axis being centrally located in a transverse direction and extending substantially parallel to a direction of displacement of the pan along the first conveyor; and activating the first conveyor to displace the inverted pan away from the table until the pan has been ejected from the table.

31. The method as defined in claim 30, further comprising sensing the presence of the pan on the upper surface of the rotating table and actuating the pan engagement mechanism to releasably fasten the pan in place on the upper surface.

32. The method as defined in claim 30, further comprising using an entry conveyor assembly disposed upstream of the table to feed the pan to the first conveyor on the table, the entry conveyor assembly including an ejection conveyor immediately upstream of the table.

33. The method as defined in claim 32, further comprising matching a speed of the first conveyor disposed on the upper surface of the table, when actuated, with a speed of the ejection conveyor.

34. The method as defined in claim 30, further comprising cleaning the pan by directing cleaning air jets thereon.

35. The method as defined in claim 34, further comprising performing the step of cleaning while rotating the table.

36. The method as defined in claim 34, further comprising directing cleaning air jets out of an air header disposed at least above the upper surface of the table, using at least one of nozzles and air knives in fluid flow communication with the air header.

37. The method as defined in claim 36, further comprising feeding airflow to the air headers using an air recycling and filtering system contained within a semi-airtight chamber within which the pan inverting system is contained.

38. A method of using a pan inverting system, the method comprising:

using at least one entry conveyor to displace a pan to a rotating table beneath an air header;

using a second conveyor to position the pan in place on an upper surface of the rotating table;

rotating the table about a longitudinal axis thereof to invert the pan, including releasably fastening the pan to the upper surface of the table; and directing cleaning air jets out of the air header onto right-side-up surfaces of the pan on the upper surface of the table using at least one of nozzles and air knives in fluid flow communication with the air header.

39. The method as defined in claim 38, further comprising feeding airflow to the air headers using an air recycling and filtering system contained within a semi-airtight chamber within which the pan inverting system is contained.

40. The method as defined in claim 38, further comprising carrying out the step of rotating the table to invert the pan while directing the cleaning air jets onto the pan.

41. The method as defined in claim 38, wherein the step of using the at least one entry conveyor further comprises displacing the pan through brushes which scrub the right-side-up surfaces of the pan.

* * * * *